US009906363B2

(12) United States Patent
Obana et al.

(10) Patent No.: US 9,906,363 B2
(45) Date of Patent: Feb. 27, 2018

(54) ENCRYPTED DATA VERIFICATION SYSTEM, METHOD AND RECORDING MEDIUM

(71) Applicant: NEC CORPORATION, Tokyo (JP)

(72) Inventors: Satoshi Obana, Tokyo (JP); Toshiyuki Isshiki, Tokyo (JP); Kengo Mori, Tokyo (JP); Toshinori Araki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 439 days.

(21) Appl. No.: 14/412,489

(22) PCT Filed: Jul. 12, 2013

(86) PCT No.: PCT/JP2013/069132
§ 371 (c)(1),
(2) Date: Jan. 2, 2015

(87) PCT Pub. No.: WO2014/010725
PCT Pub. Date: Jan. 16, 2014

(65) Prior Publication Data
US 2015/0195090 A1     Jul. 9, 2015

(30) Foreign Application Priority Data

Jul. 13, 2012    (JP) ................. 2012-157265

(51) Int. Cl.
*H04L 9/30*     (2006.01)
*H04L 9/32*     (2006.01)
(Continued)

(52) U.S. Cl.
CPC ............... *H04L 9/30* (2013.01); *G06F 21/32* (2013.01); *H04L 9/008* (2013.01); *H04L 9/0841* (2013.01);
(Continued)

(58) Field of Classification Search
CPC ...... G06F 21/32; G06F 21/6245; G06F 21/62; H04L 9/3231; H04L 9/0841; H04L 9/008;
(Continued)

(56) References Cited

U.S. PATENT DOCUMENTS

| 4,322,577 A | * | 3/1982 | Brandstrom | .......... H04L 9/0618 380/29 |
| 5,745,578 A | * | 4/1998 | Hassan | .................. H04L 9/0838 380/283 |

(Continued)

FOREIGN PATENT DOCUMENTS

| JP | 2005-130384 A | 5/2005 |
| JP | 2006-158851 A | 6/2006 |

(Continued)

OTHER PUBLICATIONS

Kelkboom (multi-algorithm fusion with template protection).pdf LKelkboom et al. Jun. 9, 2009 IEEE.*

(Continued)

*Primary Examiner* — Saleh Najjar
*Assistant Examiner* — Shu Chun Gao
(74) *Attorney, Agent, or Firm* — Sughrue Mion, PLLC

(57) ABSTRACT

The present invention makes it possible, in encrypted data verification, to avoid the leaking of information related to the original plaintext, thereby ensuring safety. The system of the present invention is provided with: means (103 in FIG. 1) for generating first and second auxiliary data for verifying whether or not the Hamming distance of a plaintext between a first encrypted data in which input data is encrypted and is recorded in a storage device, and a second encrypted data obtained by encrypting input data of a target to be checked is equal to or less than a predetermined value; and means (402 and 403 in FIG. 1) for taking the difference between the first encrypted data recorded in the storage device, and the (Continued)

second encrypted data, and determining, using the first and second auxiliary data, whether or not the Hamming distance of the plaintext corresponding to the difference between the first encrypted data and the second encrypted data is equal to or less than the predetermined value.

12 Claims, 5 Drawing Sheets

(51) Int. Cl.
G06F 21/32 (2013.01)
H04L 9/08 (2006.01)
H04L 9/00 (2006.01)

(52) U.S. Cl.
CPC ........ *H04L 9/3231* (2013.01); *H04L 2209/24* (2013.01); *H04L 2209/34* (2013.01)

(58) Field of Classification Search
CPC ... H04L 9/30; H04L 2209/34; H04L 2209/24; H04L 9/002; H04L 9/06; H04L 9/0819; H04L 9/0618; H04L 9/3242; H04L 9/3239
See application file for complete search history.

(56) References Cited

U.S. PATENT DOCUMENTS

2008/0232597 A1* 9/2008 Mare .................... H04L 9/0618
380/278
2012/0207299 A1* 8/2012 Hattori ................... H04L 9/008
380/30
2013/0174243 A1 7/2013 Inatomi et al.

FOREIGN PATENT DOCUMENTS

| RU | WO2006054208 | * | 5/2006 |
| WO | 2005/122467 A1 | | 12/2005 |
| WO | 2011/052056 A1 | | 5/2011 |
| WO | 2012/042775 A1 | | 4/2012 |

OTHER PUBLICATIONS

Blanton (Secure Computation of Biometric Matching).pdf Blant et al. Apr. 22, 2009.*
Communication dated Feb. 4, 2016 from the European Patent Office issued in corresponding Application No. 13816633.5.
Pim Tuyls et al., "Practical Biometric Authentication with Template Protection", Proceedings of AVBPA 2005, Lecture Notes in Computer Science, 2005, pp. 436-446, vol. 3546, Springer Verlag.
Christian Rathgeb et al., "A survey on biometric cryptosystems and cancelable biometrics", EURASIP Journal on Information Security, [online], Sep. 2011, 2011:3, pp. 1-25. (URL : http://link.springer.com/article/10.1186/1687-417X-2011-3 ).
International Search Report of PCT/JP2013/069132 dated Oct. 8, 2013 [PCT/ISA/210].

* cited by examiner

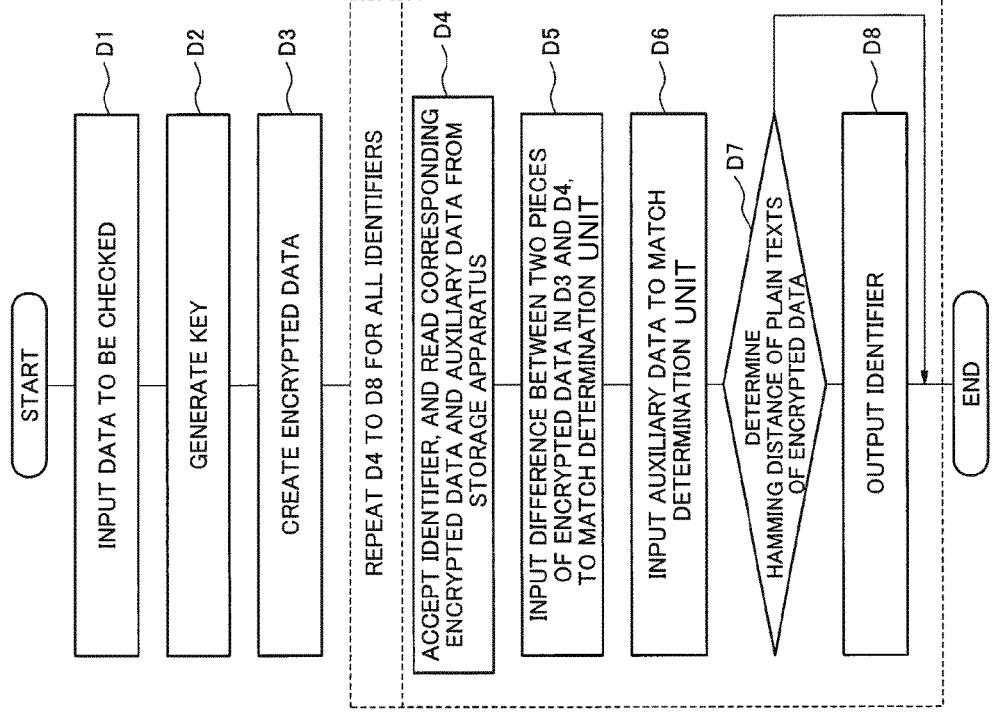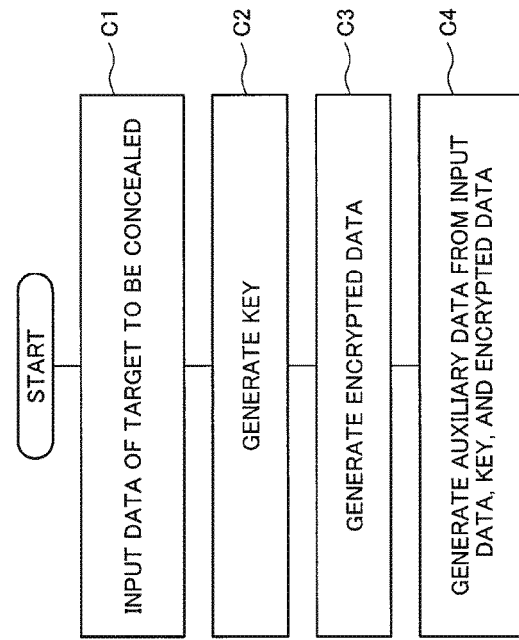

ENCRYPTED DATA VERIFICATION SYSTEM, METHOD AND RECORDING MEDIUM

CROSS REFERENCE TO RELATED APPLICATIONS

This application is a National Stage of International Application No. PCT/JP2013/069132, filed Jul. 12, 2013, claiming priority based on Japanese Patent Application No. 2012-157265, filed Jul. 13, 2012, the contents of all of which are incorporated herein by reference in their entirety.

DESCRIPTION OF RELATED ART

The present invention is related to an encrypted data (ciphertext) checking (verifying) system, method, and program.

BACKGROUND ART

Recently, along with the popularization of cloud computing, data of a user is stored in a calculation resource that is connected to a network, and service based on the data has been spreading rapidly. In such service, an opportunity to deal with sensitive data of the user has been increased. Therefore, it is important to guarantee the safe management of the data on the user. Under such an environment, research and development of a technology, that enables to manage that data in encrypted state in an open network environment, and execute a search, a statistics processing and the like by using the data without decryption, has been performed actively.

In addition, recently, a crime, which exploits the vulnerability of personal authentication such like using a password or a magnetic card, occurs frequently. Therefore, a biometric identification technology having further high safety based on a biometric feature, such as a fingerprint and vein, attracts considerable attention. In the biometric identification, in order to verify authentication information, it is necessary to store a template related to biological information in a database (DB). The biological information such the fingerprint and vein is data that is basically not changed through the lifetime. If the biological information is leaked, serious damage occurs by the leakage of the information. Therefore, the biological information is information for which the confidentiality is required the most. Thus, it is necessary to prevent impersonation even if the template is leaked.

Thus, a biometric identification technology which protects templates (a template protection type biometric identification technology), in which the authentication is performed while template information remains concealed, has become important.

For example, in Patent literature 1, a method is disclosed in which biometric identification is performed using, as a template, data that is obtained by representing fingerprint data as points on a polynomial expression, adding random points to the points, and concealing the fingerprint data.

However, in the above-described method disclosed in Patent literature 1, it is known that there is a problem whether or not the biological information is protected with sufficient strength when the biometric identification is repeated plural times.

In Non-Patent literature 1, a method is disclosed in which biological information is protected by masking a template that is stored in a DB through a random Bose-Chaudhuri-Hocquenghem (BCH) code word. In the technology disclosed in Non-Patent literature 1, a biometric identification template is generated using biological information Z and confidential information S. FIG. 5 is a diagram based on FIG. 2 of Non-Patent literature 1, and the feature extraction, statistical analysis, quantization, and the like in FIG. 2 of Non-Patent literature 1 are omitted. The enrollment of a template is performed as follows.

(1) The confidential information S is input to an encoder (ENC). The ENC performs error correcting coding (ECC) on the confidential information S, and generates a code word C. A binary BCH code of parameters (K, s, and d) is used as the ECC. "K" indicates the length of the code word, and "s" indicates the number of information symbols, and "d" indicates the number of correctable errors.

(2) An XOR (exclusive OR) between "C" and "Z", that is, "$W2=C(+)Z$" is calculated (hereinafter, the symbol "(+)" indicates bitwise XOR).

(3) "S" is input to a cryptographic (one-way) hash function H, such as a secure hash algorithm (SHA)-1 or the like, and the hash value H(S) is calculated.

(4) "W2" and "H(S)" are stored in a DB as template information.

The verification of whether or not the template, that has been generated as described in (1) to (4), and the other biological information Z', are obtained from an identical person, is performed as follows.

(1) The XOR between "Z'" and "W2", that is, "$C'=W2(+)Z'=C(+)(Z(+)Z')$" is calculated.

(2) "C'" is input to a decoder (DEC), and error-correcting decoding of the BCH code is performed to calculate "S'".

(3) "5" is input to the cryptographic (one-way) hash function H, such as the SHA-1 or the like, to calculate a hash value H(S').

(4) "H(S)" is read from the DB, and it is verified whether or not "H(S)=H(S')" is satisfied. When "H(S)=H(S')" is satisfied, it is determined that the template and the biological information Z' are obtained from an identical person. When "H(S)=H(S')" is not satisfied, it is determined that the template and the biological information Z' are respectively obtained from different persons.

The method illustrated in FIG. 5 does not depend on the obtaining method of the biological information Z. Therefore, generally, the method illustrated in FIG. 5 may be regarded as a method that verifies whether or not the encrypted data is generated by encrypting a plaintext of which distance to presented data is in certain distance.

CITATION LIST

Patent Literature

[PTL 1] Japanese Laid-open Patent Publication No. 2006-158851

Non Patent Literature

[NPL 1]: Pim Tuyls, Anton H. M. Akkermans, Tom A. M. Kevenaar, Geert-Jan Schrijen, Asker M. Bazen and Raymond N. J. Veldhuis, "Practical Biometric Authentication with Template Protection", Proceedings of AVBPA 2005, Lecture Notes in Computer Science, Vol. 3546, Springer Verlag, pp. 436-446, (2005)

SUMMARY OF INVENTION

Technical Problem

The analysis of the related arts is described below.

As a problem of the above-described related arts, in the verification of the encrypted data in the DB, it is probable that information about the plaintext (decrypted data) is leaked to an administrator or the like who performs the verification. The reason is as follows.

For example, in the above-described Patent literature 1, the degree of confidentiality of the encrypted data is not sufficient.

In addition, in the above-described Non-Patent literature 1, in order to enable verification of whether or not the encrypted data is obtained by data that is within a certain Hamming distance from the presented data, it is necessary that the plaintext information is transmitted at the time of the verification. As described above, when the verification processing is performed multiple times, it is probable that the information on the original plaintext is leaked, and for example, the sufficient safety may not be ensured when the data base administrator or the like who performs the verification processing has a malicious intention.

Thus, the present invention is made in view of the above problems. An object of the present invention is to provide a system, a method, and a program in which in verification of an encrypted data, leakage of information on the original plaintext is able to be avoided, and the safety is able to be ensured.

Solution to Problem

In the present invention, there is provided an encrypted data verification system that includes
  means for generating first and second auxiliary data that are used to verify, that a Hamming distance between a plaintext of a first encrypted data which is encrypted from input data and registered to a storage apparatus, and a plaintext of a second encrypted data which is encrypted from input data of a target to be verified, is a predetermined certain value or less, for the first encrypted data and the second encrypted data respectively; and
  means for obtaining a difference between the first encrypted data that is registered to the storage apparatus and the second encrypted data that is obtained by encrypting the input data of the target to be verified, and determining whether or not the Hamming distance of the plaintexts, which corresponds to the difference between the first encrypted data and the second encrypted data, is the predetermined certain value or less, using the first and second auxiliary data.

In the present invention, there is provided a biometric identification system that includes the encrypted data verification system.

In the present invention, there is provided an encrypted data verification method that includes
  generating first and second auxiliary data that are used to verify, that a Hamming distance between a plaintext of a first encrypted data which is encrypted from input data and registered to a storage apparatus, and a plaintext of a second encrypted data which is encrypted from input data of a target to be verified, is a predetermined certain value or less, for the first encrypted data and the second encrypted data respectively; and
  obtaining a difference between the first encrypted data that is registered to the storage apparatus and the second encrypted data that is obtained by encrypting the input data of the target to be verified, and determining whether or not the Hamming distance of the plaintexts, which corresponds to the difference between the first encrypted data and the second encrypted data, is the predetermined certain value or less, using the first and second auxiliary data.

In the present invention, there is provided a program that causes a computer to execute
  a processing of generating first and second auxiliary data that are used to verify, that a Hamming distance between a plaintext of a first encrypted data which is encrypted from input data and registered to a storage apparatus, and a plaintext of a second encrypted data which is encrypted from input data of a target to be verified, is a predetermined certain value or less, for the first encrypted data and the second encrypted data respectively; and,
  a processing of obtaining a difference between the first encrypted data that is registered to the storage apparatus and the second encrypted data that is obtained by encrypting the input data of the target to be verified, and determining whether or not the Hamming distance of the plaintexts, which corresponds to the difference between the first encrypted data and the second encrypted data, is the predetermined certain value or less, using the first and second auxiliary data. In the present invention, there is provided a computer readable recording medium (magnetic/optical recording medium or semiconductor recording medium) to which the program is recorded.

Advantageous Effects of Invention

In the present invention, in verification of an encrypted data, information leakage of the original plaintext can be avoided, and the safety can be ensured.

BRIEF DESCRIPTION OF DRAWINGS

FIGS. 4(A) and 4(B) are diagrams respectively illustrating a data registration phase and an encrypted data verification phase according to the second exemplary embodiment of the present invention.

DESCRIPTION OF EMBODIMENTS

Figure 1:
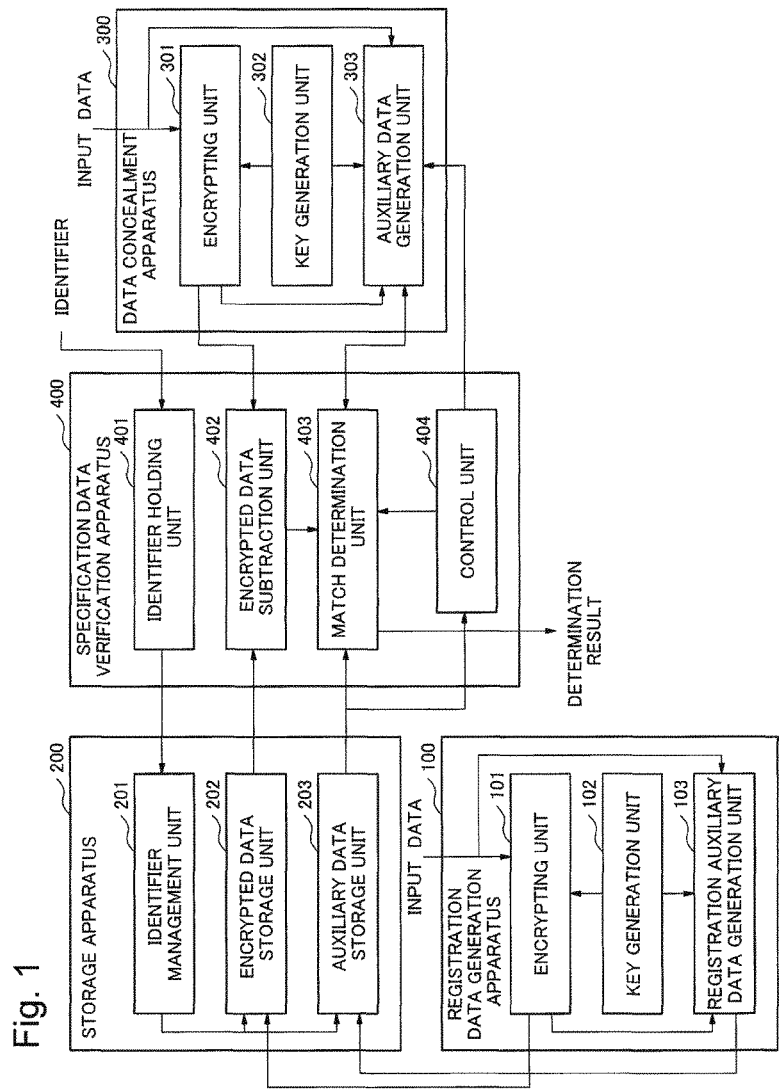
FIG. 1 is a diagram illustrating a configuration according to a first exemplary embodiment of the present invention.

Exemplary embodiments of the present invention are described below. In the exemplary embodiments of the present invention, input data of a target to be checked is encrypted, and registration data (registered data) that is used to perform verification for the input data is encrypted, and a Hamming distance of plaintext is used as an indicator of ambiguity of determination of the verification (matching). Not only the encrypted registration data, the input data for the verification is also encrypted through an encrypting method having a high concealment strength. Even when the verification is performed multiple times using identical input data, key information that is used to perform concealment of the data is changed each time the verification is performed. Therefore, even when the verification is performed multiple times, a possibility about leakage of information about the plaintext may be reduced, and the attack resistance is enhanced to contribute to the improvement of the security.

In an exemplary embodiment, a system includes means (103 in FIGS. 1 and 303 in FIG. 2) that generates first and second auxiliary data, that are described later. In addition, the system further includes determination means (402 and 403 in FIG. 1, and 502 and 503 in FIG. 2) determines whether or not a Hamming distance of plaintexts, which corresponds to a difference between a first encrypted data that is described later and a second encrypted data that is also described later, is a predetermined certain value or less.

Such a first encrypted data is obtained by encrypting input data and is registered to a storage apparatus. Such a second encrypted data is obtained by encrypting input data of a target to be checked (verified). Such first and second auxiliary data are used to verify that the Hamming distance of the plaintexts between the first encrypted data and the second encrypted data is the predetermined certain value or less.

In addition, the above-described determination means obtains the difference between the above-described first encrypted data and the above-described second encrypted data. The above-described determination means determines whether or not the Hamming distance of the plaintexts, which corresponds to the difference between the above-described first encrypted data and the above-described second encrypted data, is a predetermined certain value or less, by using the above-described first and second auxiliary data. In the exemplary embodiment, the system generates the above-described encrypted data, from the calculation result of an XOR between a code word that is obtained by encoding a key, that is used to perform encoding on the plaintext of the above-described input data, through an error-correcting code having linearity, and the above-described plaintext. Then the system calculates the above-described encrypted data, that is registered to the above-described storage apparatus, and above-described first and second auxiliary data, that are respectively related to the above-described encrypted data of the above-described input data of a target to be verified, based on an XOR between an inner product of the above-described key and a constant, and a cryptographic (one-way) hash function that is executed on the above-described encrypted data and a random number. In addition, in the exemplary embodiment, in a hash function that is used to determine the verification result, the system guarantees that a hash value of the sum of two pieces of data can be calculated from respective hash values of the two pieces of data. As a result, the system enables verification processing between encrypted data, which is not able to be achieved in the above-described Non-Patent literature 1.

As described above, in the verification processing between encrypted data, data that is transmitted by a user who performs the verification is also encrypted with an encrypting key that is unknown to a database administrator or the like. Therefore, even when the verification processing is performed multiple times, or when the database administrator or the like, who executes the verification processing, has a malicious intention, leakage of information that is related to the original plaintext is able to be avoided. Some exemplary embodiments are described below.

First Exemplary Embodiment

Referring to FIG. 1, a system according to a first exemplary embodiment of the present invention includes a registration data generation apparatus 100, a storage apparatus 200, a data concealment apparatus 300, and a specification data verification apparatus 400. It is noted that these apparatuses may be configured to form a single apparatus in a single site, by integrating themselves, or may be configured so as to form distributed arrangement and to be connected to each other through a communication means.

The registration data generation apparatus 100 includes an encrypting unit 101, a key generation unit 102, and a registration auxiliary data generation unit 103.

The encrypting unit 101 accepts following data as inputs. That is, the encrypting unit 101 accepts input data that is to be concealed (concealment target data), and a key that is used to conceal the input data. The encrypting unit 101 outputs the encrypted data that is obtained by executing concealment processing on the input data, by using the key.

The key generation unit 102 generates the key that is used by the encrypting unit 101 to conceal the input data, and outputs the key to the encrypting unit 101 and to the registration auxiliary data generation unit 103.

The registration auxiliary data generation unit 103 accepts the following data as inputs. That is, the registration auxiliary data generation unit 103 accepts the input data, the encrypted data that is output from the encrypting unit 101, and the key that is output from the key generation unit 102. The registration auxiliary data generation unit 103 generates and outputs the following data. That is, the registration auxiliary data generation unit 103 generates, input data that corresponds to encrypted data that is output from an encrypting unit 301 of the data concealment apparatus 300, and data (auxiliary data) that is used to determine that a Hamming distance with the input data that has been input to the encrypting unit 101 is a predetermined certain value or less (within a certain numeric value).

The encrypted data that is output from the encrypting unit 101 of the registration data generation apparatus 100 satisfies the following relationship. That is, when an encrypted data that is obtained by encrypting input data m1 by using a key k1 by the encrypting unit 101 is treated as "c1", and an encrypted data that is obtained by encrypting input data m2 by using a key k2 by the encrypting unit 101 is treated as "c2", the sum of "c1" and "c2", that is, "c1+c2" becomes an encrypted data that is obtained by encrypting input data m1+m2 by using a key k1+k2.

The storage apparatus 200 includes an identifier management unit 201, an encrypted data storage unit 202, and an auxiliary data storage unit 203. The encrypted data storage unit 202 and the auxiliary data storage unit 203 respectively store the encrypted data and the registration auxiliary data that has been output from the registration data generation apparatus 100. The encrypted data storage unit 202 and the auxiliary data storage unit 203 may be configured as DBs (or, may have file configurations).

The encrypted data storage unit 202 and the auxiliary data storage unit 203 respectively output encrypted data and auxiliary data that correspond to an identifier that is input from the specification data verification apparatus 400, under the control of the identifier management unit 201, when encrypted data are verified.

The identifier management unit 201 of the storage apparatus 200 manages an identifier that is used to uniquely identify encrypted data and auxiliary data that are input from the registration data generation apparatus 100.

When an identifier is input from the specification data verification apparatus 400, the identifier management unit 201 issues an instruction of output of encrypted data that corresponds to the input identifier, to the encrypted data storage unit 202. In addition, when the identifier is input from the specification data verification apparatus 400, the identifier management unit 201 issues an instruction of output of auxiliary data that corresponds to the input identifier, to the auxiliary data storage unit 203.

The encrypted data storage unit 202 stores encrypted data that has been output from the encrypting unit 101 of the registration data generation apparatus 100. When an instruction of output of encrypted data is input from the identifier management unit 201, the encrypted data storage unit 202 outputs the corresponding encrypted data.

The auxiliary data storage unit 203 stores auxiliary data that has been output from the registration auxiliary data generation unit 103 of the registration data generation apparatus 100. When an instruction of output of encrypted data is input from the identifier management unit 201, the auxiliary data storage unit 203 outputs the corresponding auxiliary data.

The data concealment apparatus 300 includes an encrypting unit 301, a key generation unit 302, and an auxiliary data generation unit 303.

The encrypting unit 301 accepts following data as inputs. That is, the encrypting unit 301 accepts input data that is a concealment target (input data of a target to be verified), and a key that is used to perform concealment of the input data. The encrypting unit 301 outputs encrypted data that is obtained by executing the encrypting processing for the input data using the key.

The key generation unit 302 generates the key that is used to perform concealment of the input data by the encrypting unit 301. In addition, the key generation unit 302 outputs the generated key to the encrypting unit 301 and the auxiliary data generation unit 303.

The auxiliary data generation unit 303 accepts following data as inputs. That is the auxiliary data generation unit 303 accepts the input data, the encrypted data that has been output from the encrypting unit 301, and the key that has been output from the key generation unit 302. The auxiliary data generation unit 303 outputs auxiliary data based on such inputs. Such auxiliary data is used to determine whether or not a Hamming distance between the input data (plaintext) that corresponds to the encrypted data that is output from the encrypting unit 101 of the registration data generation apparatus 100 (encrypted registration data), and the data (plaintext) that has been input to the encrypting unit 301, is a predetermined certain value or less (within a certain numeric value). In other words, such auxiliary data is auxiliary information that is used to determine that the input data (plaintext) that corresponds to the encrypted registration data is matched with the data of the target to be verified (plaintext), which has been input to the encrypting unit 301, when the Hamming distance between these data is the certain value or less (or, less than the certain value). And also such auxiliary data is auxiliary information that is used to determine that the input data is not matched with the data of the target to be verified when the Hamming distance between the data exceeds the above-described certain value (or, the certain value or more).

The encrypted data that is output from the encrypting unit 301 of the data concealment apparatus 300 is calculated through the same method (manner) as the encrypting unit 101. That is, when the encrypted data that is obtained by encrypting the input data m1 using the key k1 is treated as "c1", and the encrypted data that is obtained by encrypting the input data m2 using the key k2 is treated as "c2", the sum of "c1" and "c2", that is, "c1+c2" becomes the encrypted data that is obtained by encrypting the input data m1+m2 by using the key k1+k2.

The specification data verification apparatus 400 includes an identifier holding unit 401, an encrypted data subtraction unit 402, a match determination unit 403, and a control unit 404.

The identifier holding unit 401 accepts an identifier as an input. The identifier holding unit 401 issues an instruction to output of encrypted data data and auxiliary data that correspond to the identifier that has been input to the storage apparatus 200, for the identifier management unit 201 of the storage apparatus 200.

The encrypted data subtraction unit 402 accepts following data as inputs. That is the encrypted data subtraction unit 402 accepts one piece of data among encrypted data (encrypted registration data) that are stored in the encrypted data storage unit 202 of the storage apparatus 200, and the encrypted data that is output from the encrypting unit 301 of the data concealment apparatus 300. The encrypted data subtraction unit 402 outputs a difference between the two pieces of input encrypted data c1 and c2, that is c1−c2.

When the encrypted data that is obtained by encrypting the input data m1 using the key k1 is treated as "c1", and the encrypted data that is obtained by encrypting the input data m2 using the key k2 is treated as "c2", due to the feature of the encrypting unit 101 and the encrypting unit 301, the difference c1−c2 between the two encrypted data c1 and c2 becomes an encrypted data that is obtained by encrypting input data m1-m2 using a key k1-k2.

The match determination unit 403 accepts the following data as inputs. That is, match determination unit 403 accept one piece of data among auxiliary data that are stored in the auxiliary data storage unit 203 of the storage apparatus 200, the auxiliary data that is output from the auxiliary data generation unit 303 of the data concealment apparatus 300, and the difference between the two pieces of encrypted data, which is output from the encrypted data subtraction unit 402.

The match determination unit 403 outputs whether or not a Hamming distance between the plaintexts m1 and m2 that respectively correspond to the two pieces of encrypted data c1 and c2 that has been input to the encrypted data subtraction unit 402, is the predetermined certain value or less.

The control unit 404 controls the communication and the like when data is transmitted and received between the data concealment apparatus 300 and the specification data verification apparatus 400.

Next, an operation in the first exemplary embodiment is described with reference to the flow diagram illustrated in FIG. 3. The operation of the encrypted data verification system according to the first exemplary embodiment is mainly divided into two phases of a data registration phase, and an encrypted data verification phase.

In the data registration phase, input data is input to the registration data generation apparatus 100, and such input data is encrypted, and registered to the storage apparatus 200 with auxiliary data.

In the encrypted data verification phase, data that has been input to the data concealment apparatus 300 is encrypted. In the encrypted data verification phase, it is determined whether or not the encrypted data and auxiliary data, that have been generated through the encrypting process, correspond to plaintexts that are close (the Hamming distance of which is the predetermined certain value or less) to the plaintext that corresponds to the encrypted data and auxiliary data in the storage apparatus, which are specified by an identifier that is input separately.

Figure 3B:
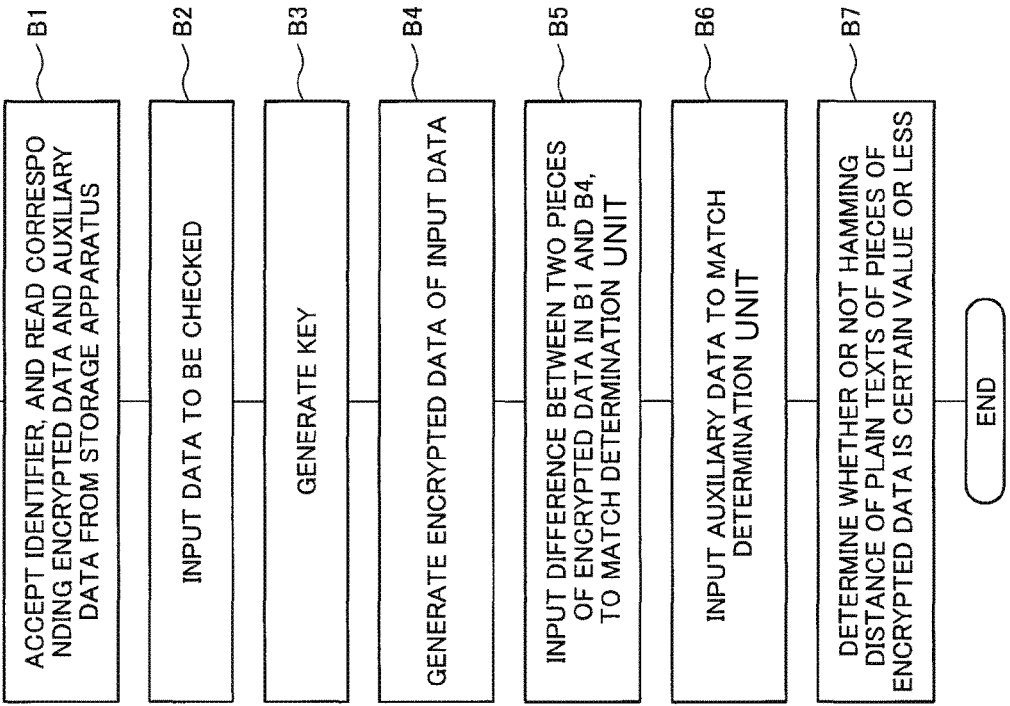
FIGS. 3(A) and 3(B) are diagrams respectively illustrating a data registration phase and an encrypted data verification phase according to the first exemplary embodiment of the present invention.
Figure 3A:
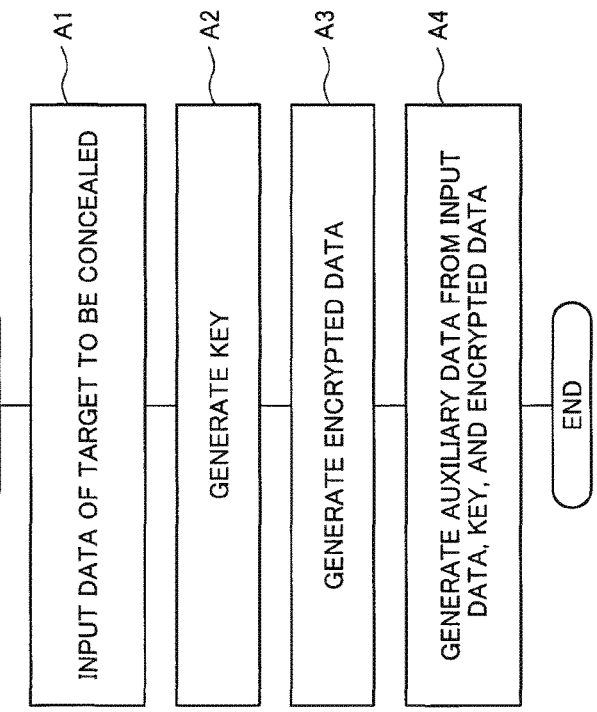
Figure 5:
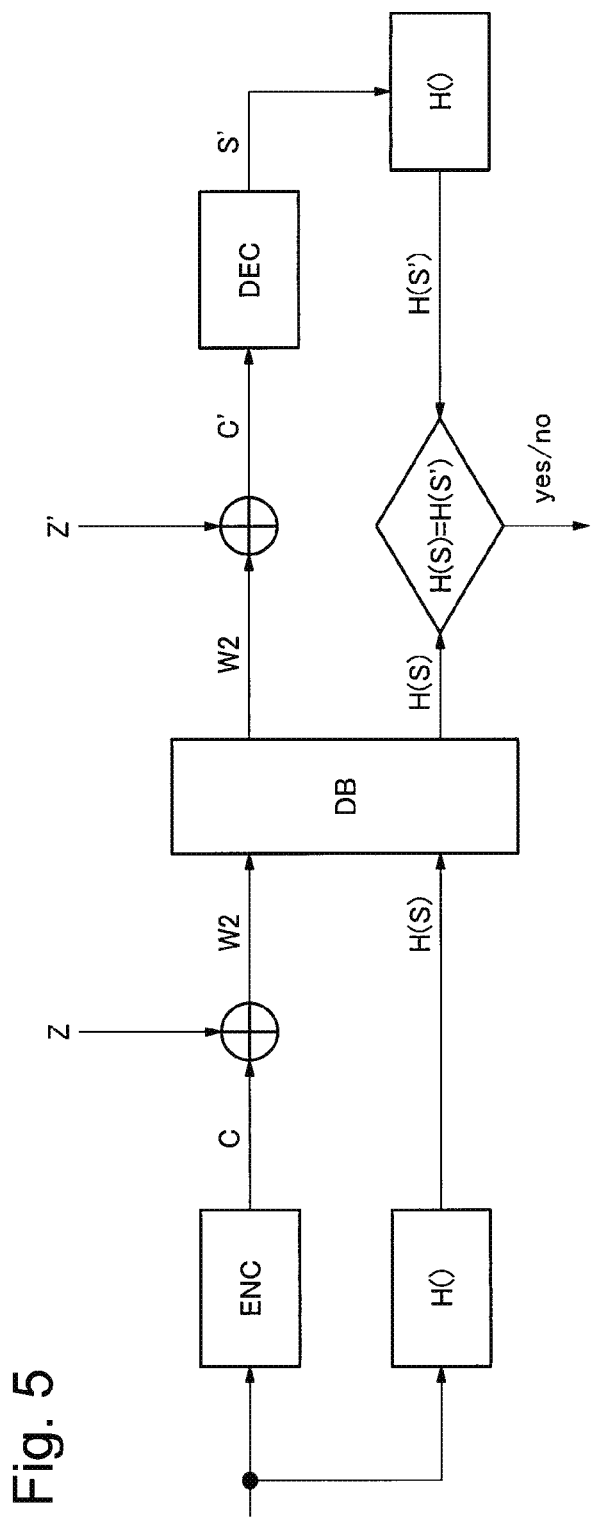
FIG. 5 is a diagram illustrating a scheme in Non-Patent Literature 1.

In the data registration phase, first, input data that is a target of concealment (concealment target data) is input to the encrypting unit 101 of the registration data generation apparatus 100 (step A1 in FIG. 3(A)).

Next, the key generation unit 102 of the registration data generation apparatus 100 generates a key that is used to perform concealment of the input data. After that, the key generation unit 102 outputs the generated key to the encrypting unit 101 and the registration auxiliary data generation unit 103 (step A2 in FIG. 3(A)).

Next, the encrypting unit 101 of the registration data generation apparatus 100 calculates encrypted data that is obtained by encrypting the input data, based on the input data and the key. After that, the encrypting unit 101 stores the calculated encrypted data in the encrypted data storage unit 202 (step A3 in FIG. 3(A)).

Next, following data are input to the registration auxiliary data generation unit 103. That is, the input data that has been input in the step A1, the key that has been generated in the step A2, the encrypted data that has been generated in the step A3 are input to the registration auxiliary data generation unit 103. After that, auxiliary data that has been output from the registration auxiliary data generation unit 103 is stored in the auxiliary data storage unit 203 of the storage apparatus 200 (step A4 in FIG. 3(A)).

The identifier management unit 201 assigns a unique identifier to the data that has been input to the storage apparatus 200, by the above-described processing. By assigned identifier, the data that has been input to the storage apparatus 200 can be referred (read).

In the encrypted data verification phase, first, an identifier is input to the identifier holding unit 401 of the specification data verification apparatus 400. Encrypted data (encrypted registration data) that corresponds to the input identifier is input from the encrypted data storage unit 202 of the storage apparatus 200 to the encrypted data subtraction unit 402. In addition, auxiliary data that corresponds to the input identifier is input from the auxiliary data storage unit 203 to the match determination unit 403 (step B1 in FIG. 3(B)).

Next, input data (data of a target to be checked) is input to the encrypting unit 301 of the data concealment apparatus 300 (step B2 in FIG. 3(B)).

Next, the key generation unit 302 of the data concealment apparatus 300 generates a key that is used to perform concealment of the input data that has been input in the step B2. After that, the key generation unit 302 outputs the generated key to the encrypting unit 301 and the auxiliary data generation unit 303 (step B3 in FIG. 3(B)).

Next, the encrypting unit 301 calculates encrypted data that is obtained by encrypting the input data, based on the input data that has been input in the step B2 and the key that has been input in the step B3. After that, the encrypting unit 301 inputs the calculated encrypted data to the encrypted data subtraction unit 402 of the specification data verification apparatus 400 (step B4 in FIG. 3(B)).

The encrypted data subtraction unit 402, to which the encrypted data has been respectively input from the encrypted data storage unit 202 of the storage apparatus 200 and the encrypting unit 301 of the data concealment apparatus 300, outputs a difference between the two pieces of the encrypted data input, to the match determination unit 403 (step B5 in FIG. 3(B)).

Next, auxiliary data are input to the match determination unit 403 from the auxiliary data storage unit 203 of the storage apparatus 200, and from the auxiliary data generation unit 303 of the data concealment apparatus 300, that are controlled by the control unit 404, respectively (step B6 in FIG. 3(B)). In this case, the auxiliary data storage unit 203 and the auxiliary data generation unit 303 may respectively input the pieces of auxiliary data to the match determination unit 403 by performing the communication in cooperation.

As described above, to the match determination unit 403, the difference between the two pieces of encrypted data is input from the encrypted data subtraction unit 402 in the step B5, and the auxiliary data are respectively input from the auxiliary data storage unit 203 and the auxiliary data generation unit 303 in the step B6. The match determination unit 403 determines whether or not a Hamming distance between the plaintext of the encrypted data that has been input to the encrypted data subtraction unit 402 in the step B1 and, the plaintext of the encrypted data that has been input to the encrypted data subtraction unit 402 in the step B4, is a predetermined certain value or less, from these input data. The match determination unit 403 outputs the determination result (step B7 in FIG. 3(B)).

It is noted that the apparatuses 100, 200, 300, and 400 of FIG. 1 may be integrated into a single computer system, or may be configured as respective apparatuses. Alternatively, the units in each of the apparatuses 100, 200, 300, and 400 may be configured as the respective apparatuses. Processing of each of the units in each of the apparatuses may be achieved by a program that is executed in a computer. In this case, in the present invention, a recording medium (semiconductor memory or magnetic/optical disk) to which the program is recorded may be provided.

Second Exemplary Embodiment

A second exemplary embodiment of the present invention is described below. In the above-described encrypted data verification system according to the first exemplary embodiment, input data and an identifier are input to the system, and verification is performed between a plaintext of encrypted data that corresponds to the identifier, and the input data. On the contrary, in the second exemplary embodiment, merely input data is input to the system, and the system outputs an identifier of encrypted data that is matched with the input data.

In the above-described first exemplary embodiment, the verification called as "one-to-one verification" can be achieved, and in the second exemplary embodiment, "1-to-many verification" can be achieved.

Figure 2:
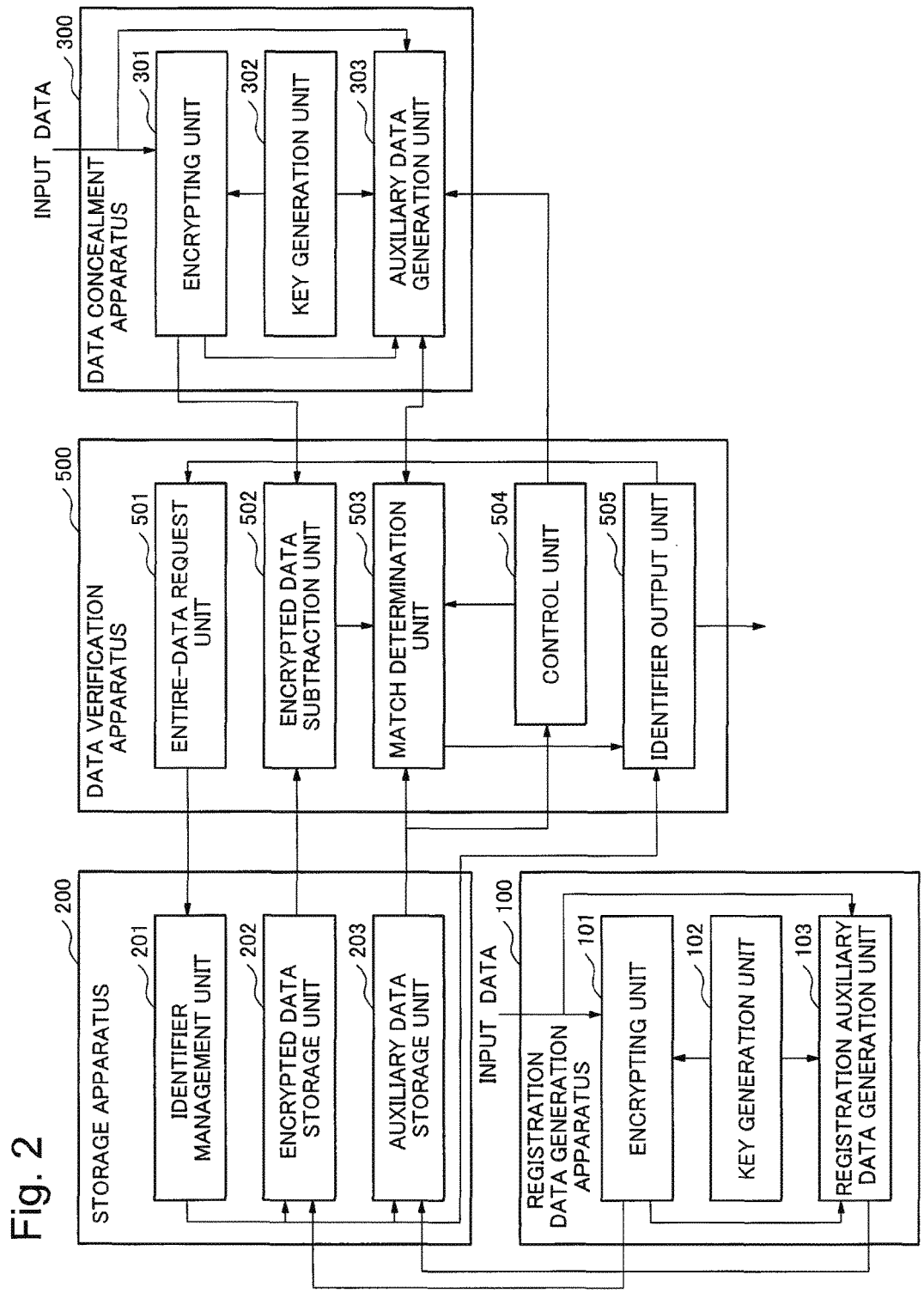
FIG. 2 is a diagram illustrating a configuration according to a second exemplary embodiment of the present invention.

Referring to FIG. 2, the system according to the second exemplary embodiment includes a registration data generation apparatus 100, a storage apparatus 200, a data concealment apparatus 300, and a data verification apparatus 500. A configuration of the registration data generation apparatus 100, the storage apparatus 200, and the data concealment apparatus 300 is similar to that of the above-described first exemplary embodiment. In the system according to second exemplary embodiment, the configuration of the data verification apparatus 500 is different from the above-described system according to first exemplary embodiment.

The registration data generation apparatus 100 includes an encrypting unit 101, a key generation unit 102, and a registration auxiliary data generation unit 103. The encrypting unit 101 accepts input data that is a concealment target (concealment target data) and a key that is used to perform concealment of the input data, as inputs. In addition, the encrypting unit 101 outputs encrypted data that is obtained by executing the encrypting processing for the input data using the key.

The key generation unit 102 generates the key that is used to perform concealment of the input data by the encrypting unit 101. After that (key generation), the key generation unit 102 outputs the generated key to the encrypting unit 101 and the registration auxiliary data generation unit 103.

The registration auxiliary data generation unit 103 accepts the input data, the encrypted data that has been output from the encrypting unit, and the key that has been output from the key generation unit 102, as inputs. After that, the registration auxiliary data generation unit 103 outputs data (auxiliary data) that is used to determine that a Hamming distance, between input data that corresponds to encrypted data that is output from the encrypting unit 301 of the data concealment apparatus 300 and the input data that is input to the encrypting unit 101, is within a certain numeric value, from the accepted inputs.

The encrypted data that is output from the encrypting unit 101 of the registration data generation apparatus 100 satisfies the following relationship. That is, the relationship includes that when the encrypting unit 101 treats an encrypted data that is obtained by encrypting input data m1 using a key k1, as "c1", and treats an encrypted data, that is obtained by encrypting input data m2 using a key k2, as "c2", the sum of "c1" and "c2", that is, "c1+c2" becomes an encrypted data that is obtained by encrypting input data m1+m2 by using a key k1+k2.

The storage apparatus 200 includes an identifier management unit 201, an encrypted data storage unit 202, and an auxiliary data storage unit 203. The storage apparatus 200 stores encrypted data and registration auxiliary data that is output from the registration data generation apparatus. In addition, the storage apparatus 200 outputs encrypted data and auxiliary data that correspond to an identifier that is input from the data verification apparatus 500, when the encrypted data is verified.

The identifier management unit 201 manages an identifier that is used to uniquely identify encrypted data and auxiliary data that are input from the registration data generation apparatus 100. After that, when the identifier has been input from the data verification apparatus 500, the identifier management unit 201 issues an instruction of output of encrypted data and auxiliary data that correspond to the input identifier, to the encrypted data storage unit 202 and the auxiliary data storage unit 203. The encrypted data storage unit 202 stores the encrypted data that has been output from the encrypting unit 101 of the registration data generation apparatus 100. After that, when the instruction of output of encrypted data has been input from the identifier management unit 201, the encrypted data storage unit 202 outputs the corresponding encrypted data. The auxiliary data storage unit 203 stores the auxiliary data that has been output from the registration auxiliary data generation unit 103 of the registration data generation apparatus 100. After that, when the instruction of output of encrypted data has been input from the identifier management unit 201, the auxiliary data storage unit 203 performs outputs the corresponding auxiliary data.

The data concealment apparatus 300 includes an encrypting unit 301, a key generation unit 302, and an auxiliary data generation unit 303.

The encrypting unit 301 accepts input data that is a concealment target (concealment target data), and a key that is used to perform concealment of the input data, as inputs. After that, the encrypting unit 301 performs output of encrypted data that is obtained by executing the encrypting processing for the input data by using the key. The key generation unit 302 generates a key that is used to perform concealment of the input data by the encrypting unit 301, and outputs the generated key to the encrypting unit 301 and the auxiliary data generation unit 303.

The auxiliary data generation unit 303 accepts the input data, the encrypted data that has been output from the encrypting unit, and the key that has been output from the key generation unit 302, as inputs. After that, based on the input data, the auxiliary data generation unit 303 outputs auxiliary data that is used to determine that a Hamming distance, between input data that corresponds to the encrypted data that is output from the encrypting unit 101 of the registration data generation apparatus 100 and the input data that has been input to the encrypting unit 301, is less than a predetermined certain value.

The encrypted data that is output from the encrypting unit 301 of the data concealment apparatus 300 is calculated by the same method as that of the encrypting unit 101. That is, when the encrypting unit 301 treats the encrypted data that is obtained by encrypting the input data m1 using the key k1, as "c1", and treats the encrypted data that is obtained by encrypting the input data m2 using the key k2, as "c2", the sum of "c1" and "c2", that is, "c1+c2" becomes the encrypted data that is obtained by encrypting the input data m1+m2 using the key k1+k2.

The data verification apparatus 500 includes an entire-data request unit 501, an encrypted data subtraction unit 502, a match determination unit 503, a control unit 504, and an identifier output unit 505.

The entire-data request unit 501 inputs an instruction of sequential read of all data that are stored in the storage apparatus, to the identifier management unit 201, in response to an instruction from the identifier output unit 505.

The encrypted data subtraction unit 502 accepts one piece of data among encrypted data that are stored in the encrypted data storage unit 202 of the storage apparatus 200, and the encrypted data that is output from the encrypting unit of the data concealment apparatus 300, as inputs. After that, the encrypted data subtraction unit 502 performs output of a difference c1–c2 between the input encrypted data c1 and c2.

When the encrypted data that is obtained by encrypting the input data m1 using the key k1, is treated as "c1", and the encrypted data that is obtained by encrypting the input data m2 using the key k2, is treated as "c2" due to the feature of the encrypting unit 101 and the encrypting unit 301, a difference c1-c2 between the two encrypted data c1 and c2 becomes the encrypted data that is obtained by encrypting the input data m1-m2 using the key k1-k2.

The match determination unit 503 accepts the following data, as inputs. That is, the match determination unit 503 accepts one piece of data among auxiliary data that are stored in the auxiliary data storage unit 203 of the storage apparatus 200, the auxiliary data that is output from the auxiliary data generation unit 303 of the data concealment apparatus 300, and the encrypted data that is output from the encrypted data subtraction unit 402.

The encrypted data subtraction unit 502 outputs whether or not a Hamming distance, between the plaintexts m1 and m2 that respectively correspond to the two pieces of encrypted data c1 and c2 that has been input to the encrypted data subtraction unit 502, is a predetermined certain value or less (or less than the certain value), based on the accepted pieces of input data.

The control unit 504 controls the communication when data is transmitted and received between the data concealment apparatus 300 and the data verification apparatus 500.

The identifier output unit 505 accepts, an identifier that has been used by the identifier management unit 201 to issue an instruction of output of data to the encrypted data storage unit 202 and the auxiliary data storage unit 203, and a determination result that has been output from the match determination unit 503, as inputs. When the match determination unit 503 determines that the matching is performed successfully (that is, the determination result indicates that input plaintext matches plaintext of registered data), the identifier output unit 505 outputs the identifier that has been input from the identifier management unit 201.

An operation in the second exemplary embodiment is described below with reference to the flow diagram illustrated in FIG. 4. The operation of the encrypted data verification system according to the second exemplary embodiment is divided into two phases of a data registration phase, and an encrypted data verification phase.

In the data registration phase, input data is input to the registration data generation apparatus 100, and such input data is encrypted, and registered to the storage apparatus 200 with auxiliary data. In the encrypted data verification phase, data that has been input to the data concealment apparatus 300 is encrypted. In addition, in the encrypted data verification phase, the identifier, corresponds to the encrypted data, stored in the storage apparatus 200 is output. That is, the identifier, corresponds to the encrypted data, to which the plaintext, that is close to the encrypted data and the auxiliary data (the Hamming distance between the plaintext and plaintexts of those data is small) that are generated through encrypting of input data, is encrypted.

In the data registration phase, first, input data that is a conceal target is input to the encrypting unit 101 of the registration data generation apparatus 100 (step C1 in FIG. 4(A)).

Next, the key generation unit 102 of the registration data generation apparatus 100 generates a key that is used to perform concealment of the input data. After that, the key generation unit 102 outputs the generated key to the encrypting unit 101 and the registration auxiliary data generation unit 103 (step C2 in FIG. 4(A)).

Next, the encrypting unit 101 calculates encrypted data that is obtained by encrypting the input data, from the input data and the key. After that, the encrypting unit 101 stores the calculated encrypted data in the encrypted data storage unit 202 (step C3 in FIG. 4(A)).

Next, the input data that has been input in the step C1, the key that has been generated in the step C2, and the encrypted data that has been generated in the step C3 are input to the registration auxiliary data generation unit 103. After that, an output (auxiliary data) of the registration auxiliary data generation unit 103 is stored in the auxiliary data storage unit 203 of the storage apparatus 200 (step C4 in FIG. 4(A)).

Through the above-described processing, a unique identifier is assigned to data (encrypted data and auxiliary data) that is stored in the storage apparatus 200, in the identifier management unit 201. The pieces of data that are stored in the storage apparatus 200 can be referred (read) by the assigned identifier.

In the encrypted data verification phase, first, input data is input to the encrypting unit of the data concealment apparatus 300 (step D1 in FIG. 4(B)).

Next, the key generation unit 302 of the data concealment apparatus 300 generates a key that is used to perform concealment of the input data. After that, the key generation unit 302 outputs the generated key to the encrypting unit 301 and the auxiliary data generation unit 303 (step D2 in FIG. 4(B)).

Next, the encrypting unit 301 calculates encrypted data that is obtained by encrypting the input data, from the input data that has been input in the step D1, and the key that has been input in the step D2. After that, the encrypting unit 301 inputs the calculated encrypted data to the encrypted data subtraction unit 502 of the data verification apparatus 500 (step D3 in FIG. 4(B)).

Next, an identifier is input from the entire-data request unit 501 to the identifier management unit 201. After that, the encrypted data that corresponds to the input identifier is input from the encrypted data storage unit 202 of the storage apparatus 200 to the encrypted data subtraction unit 502. In addition, auxiliary data that corresponds to the input identifier is input from the auxiliary data storage unit 203 to the match determination unit 503 (step D4 in FIG. 4(B)).

The encrypted data subtraction unit 502 to which the encrypted data has been respectively input from the encrypted data storage unit 202 of the storage apparatus 200 and the encrypting unit 301 of the data concealment apparatus 300, outputs a difference between the two pieces of input encrypted data, to the match determination unit 503 (step D5 in FIG. 4(B)).

Next, the pieces of auxiliary data are respectively input from the auxiliary data storage unit 203 of the storage apparatus 200 and the auxiliary data generation unit 303 of the data concealment apparatus 300, to the match determination unit 503 (step D6 in FIG. 4(B)). In this case, the auxiliary data storage unit 203 and the auxiliary data generation unit 303, that are controlled by the control unit 504, respectively input those data to the match determination unit 503 by, communicating in coordination.

As described above, to the match determination unit 503, the difference between the two pieces of encrypted data is input in the step D5, and the auxiliary data is input in the step D6.

The match determination unit 503 determines whether or not a Hamming distance between the plaintext of the encrypted data that has been input to the encrypted data subtraction unit 502 in the step D3, and the plaintext of the encrypted data that has been input to the encrypted data subtraction unit 502 in the step D4, is a predetermined certain value or less, from these input data. In addition, the match determination unit 503 outputs the determination result (step D7 in FIG. 4(B)).

When it is determined that the matching is successfully performed in the result of the step D7, that is, the determination result indicates that input plaintext matches plaintext of registered data, the identifier output unit 505 performs output of the identifier that has been input to the identifier management unit 201 in step D4 (step D8 in FIG. 4(B)).

The processing from the steps D4 to D8 is repeated for all identifiers (corresponding to all of encrypted data and auxiliary data) that are stored in the storage apparatus 200, which are managed by the identifier management unit 201 of the storage apparatus 200.

It is noted that the apparatuses 100, 200, 300, and 500 in FIG. 2 may be integrated into a single computer system. In addition, the apparatuses may be configured as respective apparatuses. Alternatively, the units in each of the apparatuses 100, 200, 300, and 400 may be configured as respective apparatuses. The processing of each of the units in each of the apparatuses in FIG. 1 may be achieved by a program that is executed by a computer. In this case, in the present invention, a recording medium (semiconductor memory or magnetic/optical disk) to the program has been recorded is provided. The above exemplary embodiments are described below with reference to a further specific example.

First Example

Next, a first example of the present invention is described in detail with reference to FIG. 1. The first example is a specific example of the above-described first exemplary embodiment.

In the data registration phase, first, as input data, a binary sequence (string) "Z" of "N" bits is input to the encrypting unit 101 of the registration data generation apparatus 100.

Next, the key generation unit 102 of the registration data generation apparatus 100 generates a key (random number of "K" bits) "S", and outputs the generated key to the encrypting unit 101 and the registration auxiliary data generation unit 103.

Next, the encrypting unit 101 calculates encrypted data "W1" of "N" bits, which is obtained by calculating an XOR between a code word "C" of "N" bits, which has been obtained by encoding the input key "S" of "K" bits using a binary BCH code, and the input data "Z" of "N" bits (see, the following Eqn. (1)). In addition, the encrypting unit 101 stores the calculated encrypted data "W1" in the encrypted data storage unit 202 of the storage apparatus 200.

$$W1 = C(+)Z \tag{1}$$

Here, calculation symbol "(+)" indicates a bitwise XOR. It is assumed that the binary BCH code used herein is a code that outputs data of "N"-bits from input data of "K"-bits ("N">"K"). And, It is also assumed that such BCH code is a code that guarantees that Hamming distance between different code words is at least "d" or more.

Next, the input data "Z", the key "S", and the encrypted data "W1" are input to the registration auxiliary data generation unit 103. The registration auxiliary data generation unit 103 calculates auxiliary data "W2", based on the inputs, in accordance with the following Eqn. (2).

$$W2 = (c,S)(+)h(W1,n) \tag{2}$$

Here, in the above-described Eqn. (2), the "c" is a constant of "K" bits. The "n" is a random number of "k" bits ("k" is a security parameter). The security parameter is a parameter that indicates the strength of the safety, and is a predetermined value that has been defined by the system. The "(c,S)" indicates an inner product. That is, "(A,B)" indicates an inner product of "A" and "B", when regarding the pieces of data of "A" and "B" (of which size respectively is "K=(m*k) bits") as arranged vectors into which divided "A" and "B" is divided for each k bits (it is assumed that the calculation is performed on the Galois field GF (2 k)). In addition, "(+)" indicates a bitwise XOR. In addition, "h" is a cryptographic (one-way) hash function which generates the output data of "k" bits (for example, SHA-256 or the like).

H(x,y,z) is defined as a function that is represented by the following Eqn. (3).

$$H(x,y,z) = (c,z)(+)h(y,z) \tag{3}$$

H(x,y,z) satisfies the following Eqn. (4).

$$H(a1,b1,c1)(+)H(a2,b2,c2) = H(a1(+)a2,b1,c1)(+)h(b2,c2) \tag{4}$$

In addition, for a random number "r" of "(K−k)" bits, a code word data that is obtained by executing error-correcting coding to the data represented with following Eqn. (5), by using the BCH code, is treated as "C3" (here, "//" is a calculation symbol that indicates bit concatenation).

$$\text{"}h(W1,N)//r\text{"} \tag{5}$$

And "W3" is calculated from "C3" and "Z" in accordance with the following Eqn. (6).

$$W3 = C3(+)Z \tag{6}$$

The registration auxiliary data generation unit 103 registers the set of "(W2,W3)" that has been calculated in accordance with the above-described Eqns. (2) and (6), to the auxiliary data storage unit 203, as auxiliary data.

In the above-described processing, to the data that has been input to the storage apparatus 200, a unique identifier is assigned by the identifier management unit 201. After that, the input data can be referred by using the assigned identifier.

Hereinafter, encrypted data "W1", and pieces of auxiliary data "W2" and "W3" that are associated with an identifier "i" are respectively represented as "W1[i]", "W2[i]", and "W3[i]".

In the encrypted data verification phase, first, the identifier "i" is input to the identifier holding unit 401 of the specification data verification apparatus 400. The encrypted data "W1[i]" that corresponds to the input identifier "i" is read (referred) from the encrypted data storage unit 202 of the storage apparatus 200, and is input to the encrypted data subtraction unit 402. In addition, the pieces of auxiliary data "W2[i]" and "W3[i]" that correspond to the input identifier "i" are read (referred) from the auxiliary data storage unit 203, and are input to the match determination unit 403.

Next, binary sequence input data "Z" of "N" bits (data to be verified) is input to the encrypting unit 301 of the data concealment apparatus 300.

Next, the key generation unit 302 of the data concealment apparatus 300 generates a key (random number of "K" bits) "S" that is used to perform concealment of the input data "Z", and outputs the generated key to the encrypting unit 301 and the auxiliary data generation unit 303.

The encrypting unit 301 of the data concealment apparatus 300 calculates the encrypted data "W1'" that is obtained by calculating an XOR between the code word "C" and the input data "Z". Here, "C" is obtained by performing error-correcting coding by using the binary BCH code on the key "S", that has been input from the key generation unit 302. After that, the encrypting unit 301 inputs the calculated encrypted data "W1'", to the encrypted data subtraction unit 402 of the specification data verification apparatus 400.

$$W1' = C'(+)Z' \tag{7}$$

To the encrypted data subtraction unit 402, the encrypted data "W1'" from the encrypting unit 301 of the data concealment apparatus 300, and the encrypted data "W1[i]" that corresponds to the identifier "i" from the encrypted data storage unit 202 of the storage apparatus 200 are input. The encrypted data subtraction unit 402 calculates a difference (XOR) between the two pieces of input encrypted data "W1'" and "W1[i]", that is, calculated with following Eqn. (8).

$$\text{"}W1'(+)W[i]\text{"} \tag{8}$$

And the encrypted data subtraction unit 402 outputs the calculated difference to the match determination unit 403.

Next, for a random number "ns" and an element (generator) "g" of a group "G" that has been defined beforehand (multiplicative group "Zp"), the control unit 404 calculates following Eqn. (9).

$$\text{"}g\_s = g^{**}ns\text{"} \tag{9}$$

In the Eqn. (9), it is assumed that "gns" indicates the ns-th power of "g" on the group "G" (multiplicative group "Zp") ("" is an exponentiation operator). The group "G" is a cyclic group for the multiplicative. The group "G" is constituted by a multiplicative group "Zp (=Z/pZ)" of a digit number "p", using "p" as a prime number. And the value of "g**ns" is given by a mod "p" using the prime number "p" as modulo.

The control unit 404 outputs "W3[i]" and "g_s" to the auxiliary data generation unit 303.

Next, the auxiliary data generation unit 303 of the data concealment apparatus 300 applies decoding processing of the binary BCH code to a value that is obtained by calculating an XOR between "W3[i]" and the input data "Z", that is calculated with following Eqn. (10).

$$W3[i](+)Z' \quad (10)$$

As the result of the calculation, the auxiliary data generation unit 303 obtains "h'" that is the decryption result.

The auxiliary data generation unit 303 calculates "W2'" and "g_c", from the key "S", the encrypted data "W1'", "h'", "g", and "g_s", and the random number "nc", based on the following Eqns. (11a) and (11b), and outputs the calculated "W2'" and "g_c" to the match determination unit 403 of the data verification apparatus 400.

$$W2'=H(S',W1',g\_s**nc)(+)h' \quad (11a)$$

$$g\_c=g**nc \quad (11b)$$

In the above-described Eqn. (11a), when "g" is treated as a generator of the multiplicative group "Zp", "g" and "p" are published, and two parties "X" and "Y" respectively calculate "A=gns (=gns mod p)" and "B=gnc (=gnc mod p)" using "ns" and "nc" (private keys). "X" transmits "A" to "Y", and "Y" transmits "B" to "X". "X" calculates "Bns=g(nc) (=g**(ns*nc)mod p)" using "ns" and "B" that has been received from "Y". And "Y" calculates "Anc=g(ns*nc) (=g**(ns*nc)mod p)" using "nc" and "A" that has been received from "X". The calculated "g**(ns*nc)mod p" is used as a key of common key encryption by "X" and "Y" (Diffie-Hellman key exchange). Even if a third party obtains "A" and "B" by eavesdropping or the like, there is no method of calculating "g**(ns*nc)mod p" from "A" and "B", so that it is difficult to generate the key. In addition, in the calculation of "g**ns", a value, on which Diffie-Hellman key exchange has been performed, is set as a random number component (NONCE), so that for example, defense against replay attacks is achieved in the application to biometric identification, that is described later.

Next, the match determination unit 403 applies the decoding processing of the binary BCH code, to the difference between the two pieces of input encrypted data "W1'" and "W[i]", that is calculated with following Eqn. (12).

$$W1'(+)W[i] \quad (12)$$

And the match determination unit 403 calculates "T" that is the decryption result of the difference between the two pieces of encrypted data "W1'" and "W[i]".

In addition, the match determination unit 403 determines whether or not a calculation result of an XOR between "H(T,W1',g_cns)(=(g_cns,T)+h(W1',g_cns))" and "W2'" is equal to "W2[i]". The equation "H(T,W1',g_cns) (=(g_cns,T)+h(W1',g_cns))" is calculated using the decryption result "T" of the difference between the two pieces of encrypted data "W1'" and "W[i]", "W1'", and "g_c**ns". "W2'" is calculated in accordance with the Eqn. (11a). In other words, the match determination unit 403 checks (verifies) whether or not the next Eqn. (13) is satisfied.

$$W2[i]=H(T,W1',g\_c**ns)(+)W2' \quad (13)$$

When the above-described Eqn. (13) is satisfied, the match determination unit 403 determines that a Hamming distance between the original data (plaintext) of "W1[i]" and the input data (plaintext) "Z'" is "d" or less. When the above-described Eqn. (13) is not satisfied, the match determination unit 403 determines that the Hamming distance between the original data (plaintext) of "W1[i]" and the input data (plaintext) "Z'" exceeds "d". After that, the match determination unit 403 outputs the determination result. It is noted that, in the above-described BCH coding, a Hamming distance between given different code words is assumed to be a value that exceeds "d" at least.

Here, "g_snc(=(gns)nc)" in the auxiliary data "W2'=H(S',W1',g_snc)(+)h'" that is generated by the auxiliary data generation unit 303 of the data concealment apparatus 300, and "g_cns(=(gnc)**ns)" in the match determination unit 403 of the specification data verification apparatus 400, may be generated, for example, in both of the auxiliary data generation unit 303 and the match determination unit 403 through the known Diffie-Hellman key exchange method.

Second Example

Next, a second example is described in detail with reference to FIG. 2. The second example is a specific example of the above-described second exemplary embodiment.

In the data registration phase, first, as input data, a binary sequence "Z" of "N" bits is input to the encrypting unit 101 of the registration data generation apparatus 100.

Next, the key generation unit 102 of the registration data generation apparatus 100 generates a random number "S" of "K" bits. In addition, the key generation unit 102 outputs the generated random number "S" (key) to the encrypting unit 101 and the registration auxiliary data generation unit 103.

Next, the encrypting unit 101 calculates encrypted data "W1" that is obtained by calculating an XOR between the code word "C" that is obtained by coding the input key "S" through the binary BCH code, and the input data "Z". In addition, the encrypting unit 101 stores the calculated encrypted data "W1" in the encrypted data storage unit 202. The binary BCH code used herein is a code outputs data of "N"-bits from input data of "K"-bits ("N">"K"). And also, such BCH code is a code that guarantees that Hamming distance between different code words is at least "d" or more.

Next, the input data "Z", the key "S", and the encrypted data "W1" are input to the registration auxiliary data generation unit 103. The registration auxiliary data generation unit 103 calculates "W2", based on the inputs, in accordance with the following Eqn. (14).

$$W2=(c,S)(+)h(W1,n) \quad (14)$$

Here, in the above-described Eqn. (14), "c" is a constant of "K" bits. In addition, "n" is a random number of "k" bits ("k" is a security parameter). In addition, "(A,B)" indicates an inner product of "A" and "B" when each of the two pieces of data "A" and "B" of "K=(m*k)" bits is regarded as a vector into which "A" and "B" is divided for each "k" bits (it is assumed that the calculation is performed on the Galois field GF (2 k)). The calculation symbol "(+)" indicates a bitwise XOR. The symbol "h" is a cryptographic (one-way) hash function in which the output corresponds to k bits (for example, SHA-256 or the like).

In addition, "H(x,y,z)" is defined as a function that is represented by the Eqn. (15) (same as the above-described Eqn. (3)).

$$H(x,y,z)=(c,x)(+)h(y,z) \quad (15)$$

For the random number "r" of "(K−k)" bits, the code word data that is obtained by encoding the data represented with following Eqn. (16), by using the BCH code, is treated as "C3" (here, "//" is a symbol that indicates bit concatenation).

$$h(W1,N)//r \quad (16)$$

And "W3" is calculated in accordance with the following Eqn. (17), from "C3" and "Z".

$$W3=C3(+)Z \quad (17)$$

The registration auxiliary data generation unit 103 registers the set of "(W2,W3)" that has been generated as described above, to the auxiliary data storage unit 203, as auxiliary data.

In the above-described processing, a unique identifier is assigned to the data that has been input to the storage apparatus 200 by the identifier management unit 201. And after that, the data that is input to the storage apparatus 200 can be referred by the assigned identifier. Hereinafter, "W1", "W2", and "W3" that are associated with the identifier "i" are respectively represented as "W1[i]", "W2[i]", and "W3[i]".

In the encrypted data verification phase, first, input data "Z" (data to be checked) is input to the encrypting unit 301 of the data concealment apparatus 300.

Next, the key generation unit 302 of the data concealment apparatus 300 generates a key "S" (random number of "K" bits) that is used to perform concealment of the input data "Z". In addition, the key generation unit 302 outputs the generated key "S" to the encrypting unit 301 and the auxiliary data generation unit 303.

The encrypting unit 301 calculates encrypted data "W1'" that is obtained by calculating an XOR between the code word "C" that is obtained by coding the input key "S" through the binary BCH code, and the input data "Z". That is, "W1'" is calculated in accordance with following Eqn. (18).

$$W1'=C(+)Z' \quad (18)$$

In addition, the encrypting unit 301 inputs the calculated "W1'" to the encrypted data subtraction unit 502 of the data verification apparatus 500.

Next, the identifier "i" is input from the entire-data request unit 501 to the identifier management unit 201. The encryption data "W1[i]" that corresponds to the input identifier "i" is read from the encrypted data storage unit 202 of the storage apparatus 200, and is input to the encrypted data subtraction unit 502. In addition, the pieces of auxiliary data "W2[i]" and "W3[i]" that correspond to the identifier "i" are read from the auxiliary data storage unit, and are input to the match determination unit 503. The encrypted data subtraction unit 502 accepts the encrypted data "W1[i]" from the encrypted data storage unit 202 of the storage apparatus 200, and the encrypted data "W1'" from the data concealment apparatus 300, as inputs. After that, the encrypted data subtraction unit 502 outputs a difference (XOR) between the two pieces of input encrypted data "W1'" and "W1[i]", that is calculated in accordance with following Eqn. (19), to the match determination unit 503.

$$W1'(+)W1[i] \quad (19)$$

Next, the control unit 504 calculates $$g\_s=g**ns \quad (20)$$

for a random number ns and an element (generator) "g" of a group (multiplicative group "Zp") "G" that is defined beforehand, and outputs the calculated value to the auxiliary data generation unit 303.

Next, the auxiliary data generation unit 303 of the data concealment apparatus 300 randomly selects "S1'" and "S2'" that satisfy following Eqn. (21).

$$S'=S1'(+)S2' \quad (21)$$

The auxiliary data generation unit 303 of the data concealment apparatus 300 calculates "W2'" and "g_c", based on the following Eqns. (22a) and (22b).

$$W2'=H(S1',W1',g\_s**nc) \quad (22a)$$

$$g\_c=g**nc \quad (22b)$$

Next, the auxiliary data generation unit 303 of the data concealment apparatus 300 calculates "W3'" from "C3" and "Z". "C3" obtained by performing the binary BCH error-correcting coding on data that is obtained by performing bit concatenation on an inner product "(c,S2')" and a random number "r". That is, the data is calculated in accordance with following Eqn. (23).

$$(c,S2')//r' \quad (23)$$

"W3'" is calculated in accordance with following Eqn. (24).

$$W3'=C3(+)Z' \quad (24)$$

In addition, the auxiliary data generation unit 303 outputs "W1'", "W2'", "W3'", and "g_c", to the match determination unit 503 of the data verification apparatus 500.

Next, the match determination unit 503 applies the decoding processing of the binary BCH code, to the difference between the pieces of input encrypted data, that is calculated in accordance with following Eqn. (25).

$$W1'(+)W1[i] \quad (25)$$

Then the match determination unit 503 calculates "T" that is the decryption result of the difference between the two pieces of encrypted data "W1'" and "W1[i]".

In addition, the match determination unit 503 applies the decoding processing of the binary BCH code, to an XOR between "W3[i]" and "W3'", that is calculated in accordance with following Eqn. (26)

$$W3[i](+)W3' \quad (26)$$

Then the match determination unit 503 calculates "w3" that is the decryption result of "W3[i](+)W3'".

The match determination unit 503 checks whether or not the result that has been obtained by calculating a bitwise XOR between "W2'", "w3", and "H(T,W1', g_cns)", that has been calculated using the decryption result "T" of the difference between the two pieces of encrypted data "W1'" and "g_cns", is equal to "W2[i]". In other words, the match determination unit 503 checks (verifies) whether or not the Eqn. (27) is satisfied.

$$W2[i]=H(T,W1',g\_c**ns)(+)W2'(+)w3 \quad (27)$$

When the above-described Eqn. (27) is satisfied, the match determination unit 503 determines that a Hamming distance between the original data of "WIN" and "Z" is "d" or less. In this case, the identifier output unit 505 outputs the identifier "i". When the above-described Eqn. (27) is not satisfied, the match determination unit 503 determines that the Hamming distance exceeds "d". In this case, the identifier output unit 505 does not output the identifier "i".

The above-described operation is performed on all identifiers "i" that are managed by the storage apparatus, and the output of all identifiers is performed that include the original data in which a Hamming distance with the input data "Z" becomes "d" or less.

In the second example, similar to the above-described first example, "g_snc(=(gns)nc)" in the auxiliary data "W2'=H(S',W1',g_snc)(+)h'" that is generated in the auxiliary data generation unit 303 of the data concealment apparatus 300, and "g_cns (=(gnc)**ns)" in the match determination unit 503 of the data verification apparatus 500 may be generated in both of the auxiliary data generation unit 303 and the match determination unit 503, for example, by the known Diffie-Hellman key exchange method.

As an application example of the first and second examples, there is authentication to protect biological information. The outline of the authentication is described below.

In this case, biological information that is obtained from a fingerprint, vein, or the like is treated as input data in the data registration phase and input data in the encrypted data verification phase.

In the above-described described system, it can be determined whether or not encrypted biometric data, that is stored in the storage apparatus, and encrypted biometric data, that has been transmitted from the data concealment apparatus, are obtained from an identical person, while the biological information remains concealed (encrypted). In other words, whether or not the pieces of biometric data are obtained from an identical person can be determined depending on whether or not a Hamming distance between these two pieces of input data is a predetermined certain value or less. In addition, in the above-described described system, the authentication can be performed based on such a determination result. Regarding biological information, identical data may not be always obtained stably. However, it can be assumed that pieces of data that are obtained from an identical person are similar to each other (pieces of data of which the Hamming distance is small, may be obtained), so that the authentication is preferably applied to biometric identification. It is noted that in the biometric identification application, for example, each value of parameters ("K", "s", "d") of the BCH may be obtained experimentally.

It is noted that each disclosure of the above-described Patent literature and Non-Patent literature is assumed to be incorporated by reference herein. Within the entire disclosure of the present invention (including claims), based on the basic technical concept, the exemplary embodiments and the examples can be modified and adjusted. In addition, within the claims of the present invention, a variety of combinations or selections can be made from various disclosure elements (including elements in each of claims, elements in each of the examples, elements in each of the drawings, and the like). In other words, the present invention includes various changes and modifications that would be made by those skilled in the art in accordance with the entire disclosure including claims and the technical idea, of course. In particular, regarding the numerical range described herein, it should be understood that any number or sub-ranges contained within the claims is specifically described even if it is not otherwise stated.

REFERENCE SIGNS LIST 100 registration data generation apparatus
101 encrypting unit
102 key generation unit
103 registration auxiliary data generation unit
200 storage apparatus
201 identifier management unit
202 encrypted data storage unit
203 auxiliary data storage unit
300 data concealment apparatus
301 encrypting unit
302 key generation unit
303 auxiliary data generation unit
400 specification data verification apparatus
401 identifier holding unit
402 encrypted data subtraction unit
403 match determination unit
404 control unit
500 data verification apparatus
501 entire-data request unit
502 encrypted data subtraction unit
503 match determination unit
504 control unit
505 identifier output unit

The invention claimed is:

1. An encrypted data verification system comprising:
an auxiliary data generation apparatus configured to generate first and second auxiliary data that are used to verify, that a Hamming distance between a plaintext of a first encrypted data which is encrypted from input data and registered to a storage apparatus, and a plaintext of a second encrypted data which is encrypted from input data of a target to be verified, is a predetermined certain value or less, for the first encrypted data and the second encrypted data respectively;
a verification apparatus configured to obtain a difference between the first encrypted data that is registered to the storage apparatus and the second encrypted data that is obtained by distance of the plaintexts, which corresponds to the difference between the first encrypted data and the second encrypted data, is the predetermined certain value or less, using the first and second auxiliary data;
a registration data generation apparatus;
a storage apparatus;
a data concealment apparatus; and
a first data verification apparatus, wherein
the registration data generation apparatus includes:
  a first encrypting unit configured to accept input data of fixed length and a key, as inputs, and output the first encrypted data that is obtained by encrypting the input data through the key, that is, the first encrypted data that satisfies a relationship that a sum of an encrypted data 1 that is obtained by encrypting a plaintext 1 through a key 1 and an encrypted data 2 that is obtained by encrypting a plaintext 2 through a key 2 is equal to an encrypted data that is obtained by encrypting a sum of the plaintext 1 and the plaintext 2 through a sum of the key 1 and the key 2;
  a first key generation unit configured to generate the key that is input to the first encrypting unit; and
  an registration auxiliary data generation unit configured to accept the input data and the key that is generated in the first key generation unit as inputs, and output the first auxiliary data that is used to verify that a Hamming distance of the plaintexts, which corresponds to a difference between the first encrypted data that is output from the first encrypting unit and the second encrypted data that is output from the data concealment apparatus is a predetermined certain value or less, and the storage apparatus includes:
an encrypted data storage unit configured to store the one or more first encrypted data that are output from the first encrypting unit of the registration data generation apparatus;
an auxiliary data storage unit configured to store the one or more pieces of first auxiliary data that are output from the registration auxiliary data generation unit of the registration data generation apparatus; and
an identifier management unit configured to accept an identifier from the first data verification apparatus, as an input, and to allow the encrypted data storage unit and the auxiliary data storage unit to output the first encrypted data and the first auxiliary data that correspond to the identifier, respectively, and the data concealment apparatus includes:
a second encrypting unit configured to accept input data of fixed length, which is a verification target, and a key, as inputs, and output the second encrypted data that is obtained by encrypting the input data of the target to be checked through the key, that is, the second encrypted data that satisfies a relationship that a sum of an encrypted data 1 that is obtained by encrypting a plaintext 1 through a key 1 and an encrypted data 2 that is obtained by encrypting a plaintext 2 through a key 2 is equal to an encrypted data that is obtained by encrypting a sum of the plaintext 1 and the plaintext 2 through a sum of the key 1 and the key 2;
a second key generation unit configured to generate the key that is input to the second encrypting unit; and
an auxiliary data generation unit configured to accept the input data of the target to be checked and the key that is generated in the second key generation unit, as inputs, and output the second auxiliary data that is used to verify that a Hamming distance of the plaintexts, which corresponds to a difference between the second encrypted data that is output from the second encrypting unit and the first encrypted data that is output from the first encrypting unit of the registration data generation apparatus is a predetermined certain value or less, and the first data verification apparatus includes:
an identifier holding unit configured to accept an identifier as an input, and output the identifier to the identifier management unit of the storage apparatus, and instructs the identifier management unit to perform output of the first encrypted data and the first auxiliary data that correspond to the identifier;
an encrypted data subtraction unit configured to accept the second encrypted data that is output from the second encrypting unit of the data concealment apparatus, and the first encrypted data that is stored in the encrypted data storage unit of the storage apparatus, as inputs, and output a difference between the input two encrypted data;
a match determination unit configured to accept the difference between the encrypted data, which is output from the encrypted data subtraction unit, the first auxiliary data that is stored in the auxiliary data storage unit of the storage apparatus, and the second auxiliary data that is output from the auxiliary data generation unit of the data concealment apparatus, as inputs, and determine whether or not a Hamming distance of the plaintexts, which corresponds to the difference between the first and second encrypted data is a predetermined certain value or less; and a control unit configured to control transmission and reception of data between the data concealment apparatus and the first data verification apparatus.

2. The encrypted data verification system according to claim 1, wherein
the system generates the encrypted data from calculation of an XOR between a code word that is obtained by encrypting a key that is used to encode the plaintext of the input data, through an error-correcting code having linearity, and the plaintext, and
the system calculates each of the first and second auxiliary data that are respectively related to the first encrypted data that is registered to the storage apparatus and the second encrypted data that is obtained by encrypting the input data of the target to be checked based on an XOR between an inner product of the corresponding key and a constant, and an output of a cryptographic hash function for a bit string based on the corresponding encrypted data.

3. The encrypted data verification system according to claim 1, wherein,
each of the first and second encrypting units encodes the key through an error-correcting code having linearity, for the key and the plaintext of the input data, and output a result that is obtained by calculating a sum on a vector of a code word that is an error-correcting coding result and the plaintext, as the encrypted data.

4. The encrypted data verification system according to claim 1, wherein
the first auxiliary data, which is output from the registration auxiliary data generation unit of the storage apparatus, includes a key S that is input to the first encrypting unit of the registration data generation apparatus, the first encrypted data W1 that is output from the first encrypting unit, and data n that is less likely to be repeatedly used, and data that is calculated by using "$(c,S)(+)h(W1,n)$" (where, "$(x,y)$" indicates an inner product of vectors x and y, and "h" indicates a cryptographic (one-way) hash function, and "$(+)$" indicates a bitwise XOR), and
the second auxiliary data, which is output from the auxiliary data generation unit of the data concealment apparatus, includes a key S' that is input to the second encrypting unit of the data concealment apparatus, the second encrypted data W1' that is output from the second encrypting unit, and data n' that is less likely to be repeatedly used, and data that is calculated by using "$(c,S')(+)h(W1',n')$".

5. The encrypted data verification system according to claim 4, wherein
the n' is generated in both of, the first data verification apparatus, and the data concealment apparatus through a Diffie-Hellman key exchange method.

6. A biometric identification system comprising:
the encrypted data verification system according to claim 1, wherein
biometric identification is performed by generating input data that are input to the registration data generation apparatus and the data concealment apparatus, based on biological information, and determining whether or not the data, that is input to the first data verification apparatus or the data verification apparatus through the data concealment apparatus, is matched with data that is stored in the storage apparatus.

7. An encrypted data verification system comprising:
an auxiliary data generation apparatus configured to generate first and second auxiliary data that are used to verify, that a Hamming distance between a plaintext of a first encrypted data which is encrypted from input data and registered to a storage apparatus, and a plaintext of a second encrypted data which is encrypted from input data of a target to be verified, is a predetermined certain value or less, for the first encrypted data and the second encrypted data respectively;

a verification apparatus configured to obtain a difference between the first encrypted data that is registered to the storage apparatus and the second encrypted data that is obtained by encrypting the input data of the target to be verified, and determine whether or not the Hamming distance of the plaintexts, which corresponds to the difference between the first encrypted data and the second encrypted data, is the predetermined certain value or less, using the first and second auxiliary data;

a registration data generation apparatus;

a storage apparatus;

a data concealment apparatus; and a second data verification apparatus, wherein the registration data generation apparatus includes:
  a first encrypting unit configured to accept input data of fixed length and a key, as inputs, and output the first encrypted data that is obtained by encrypting the input data through the key, that is, the first encrypted data that satisfies a relationship that a sum of an encrypted data 1 that is obtained by encrypting a plaintext 1 through a key 1 and an encrypted data 2 that is obtained by encrypting a plaintext 2 through a key 2 is equal to an encrypted data that is obtained by encrypting a sum of the plaintext 1 and the plaintext 2 through a sum of the key 1 and the key 2;
  a first key generation unit configured to generate the key that is input to the first encrypting unit; and
  an registration auxiliary data generation unit configured to accept the input data and the key that is generated in the first key generation unit, as inputs, and output the first auxiliary data that is used to verify that a Hamming distance of the plaintexts, which corresponds to a difference between the first encrypted data that is output from the first encrypting unit and the second encrypted data that is output from the data concealment apparatus is a predetermined value or less, and the storage apparatus includes:
  an encrypted data storage unit configured to store the one or more first encrypted data that are output from the first cipher apparatus of the registration data generation apparatus;
  an auxiliary data storage unit configured to store the one or more pieces of first auxiliary data that are output from the registration auxiliary data generation unit of the registration data generation apparatus; and
  an identifier management unit configured to accept an identifier from the second data verification apparatus, as an input, and to allow the encrypted data storage unit and the auxiliary data storage unit to output first encrypted data and the first auxiliary data that correspond to the identifier, respectively, and the data concealment apparatus includes:
  a second encrypting unit configured to accept input data of fixed length, which is a verification target, and a key, as inputs, and output the second encrypted data that is obtained by encrypting the input data of the target to be checked through the key, that is, the second encrypted data that satisfies a relationship that a sum of an encrypted data 1 that is obtained by encrypting a plaintext 1 through a key 1 and an encrypted data 2 that is obtained by encrypting a plaintext 2 through a key 2 is equal to an encrypted data that is obtained by encrypting a sum of the plaintext 1 and the plaintext 2 through a sum of the key 1 and the key 2;
  a second key generation unit configured to generate the key that is input to the second encrypting unit; and
  an auxiliary data generation unit configured to accept the input data, and the key that is generated in the second key generation unit, as inputs, and performs output of the second auxiliary data that is used to verify that a Hamming distance of the plaintexts, which corresponds to a difference between the second encrypted data that is output from the second encrypting unit and the first encrypted data that is output from the first encrypting unit of the registration data generation apparatus is a predetermined certain value or less, and the second data verification apparatus includes:
  an entire-data request unit configured to inputs an instruction of sequential read of all of data that are stored in the storage apparatus, to the identifier management unit of the storage apparatus, in response to an instruction from an identifier output unit;
  an encrypted data subtraction unit configured to accept the second encrypted data that is output from the second encrypting unit of the data concealment apparatus, and the first encrypted data that is stored in the encrypted data storage unit in the storage apparatus, as inputs, and output a difference between the input two encrypted data;
  a match determination unit configured to accept the difference between the encrypted data, which is output from the encrypted data subtraction unit, the first auxiliary data that is stored in the auxiliary data storage unit of the storage apparatus, and the second auxiliary data that is output from the auxiliary data generation unit of the data concealment apparatus, as inputs, and determine whether or not a Hamming distance of the plaintexts, which corresponds to the difference between the first and second encrypted data is a predetermined certain value or less;
  an identifier output unit configured to accept an output of the determination result from the match determination unit, and an output of the identifier management unit of the storage apparatus, as inputs, and output an identifier that corresponds data in which the match determination unit determines that the Hamming distance of plaintexts is the predetermined certain value or less; and
  a control apparatus configured to control transmission and reception of data between the data concealment apparatus and the second data verification apparatus.

8. The encrypted data verification system according to claim 7, wherein,
  each of the first and second encrypting units encodes the key through an error-correcting code having linearity, for the key and the plaintext of the input data, and output a result that is obtained by calculating a sum on a vector of a code word that is an error-correcting coding result and the plaintext, as the encrypted data.

9. The encrypted data verification system according to claim 7, wherein
  the first auxiliary data, which is output from the registration auxiliary data generation unit of the storage apparatus, includes a key S that is input to the first encrypting unit of the registration data generation apparatus, the first encrypted data W1 that is output from the first encrypting unit, and data n that is less likely to be repeatedly used, and data that is calculated by using "(c,S)(+)h(W1,n)" (where, "(x,y)" indicates an inner product of vectors x and y, and "h" indicates a cryptographic (one-way) hash function, and "(+)" indicates a bitwise XOR), and the second auxiliary data, which is output from the auxiliary data generation unit of the data concealment apparatus, includes a key S' that is input to the second encrypting unit of the data concealment apparatus, the second encrypted data W1' that is output from the second encrypting unit, and data n' that is less likely to be repeatedly used, and data that is calculated by using "(c,S')(+)h(W1',n')".

10. The encrypted data verification system according to claim 9, wherein the n' is generated in both of, the second data verification apparatus, and the data concealment apparatus through a Diffie-Hellman key exchange method.

11. A biometric identification system comprising:

the encrypted data verification system according to any one of claim 4, wherein biometric identification is performed by generating input data that are input to the registration data generation apparatus and the data concealment apparatus, based on biological information, and determining whether or not the data, that is input to the second data verification apparatus through the data concealment apparatus, is matched with data that is stored in the storage apparatus.

12. An encrypted data verification method comprising:

generating first and second auxiliary data that are used to verify, that a Hamming distance between a plaintext of a first encrypted data which is encrypted from input data and registered to a storage apparatus, and a plaintext of a second encrypted data which is encrypted from input data of a target to be verified, is a predetermined certain value or less, for the first encrypted data and the second encrypted data respectively;

obtaining a difference between the first encrypted data that is registered to the storage apparatus and the second encrypted data that is obtained by encrypting the input data of the target to be verified, and determining whether or not the Hamming distance of the plaintexts, which corresponds to the difference between the first encrypted data and the second encrypted data, is the predetermined certain value or less, using the first and second auxiliary data;

accepting input data of fixed length and a key, as inputs, and outputting the first encrypted data that is obtained by encrypting the input data through the key, that is, the first encrypted data that satisfies a relationship that a sum of an encrypted data 1 that is obtained by the plaintext 1 and the plaintext 2 through a sum of the key 1 and the key 2;

generating the key that is input;

accepting the input data and the key that is generated as inputs, and outputting the first auxiliary data that is used to verify that a Hamming distance of the plaintexts, which corresponds to a difference between the first encrypted data that is output and the second encrypted data that is output is a predetermined certain value or less;

storing the one or more first encrypted data that are output;

storing the one or more pieces of the first auxiliary data that are output;

accepting an identifier, as an input, and outputting the first encrypted data and the first auxiliary data that correspond to the identifier, respectively;

accepting input data of fixed length, which is a verification target, and a key, as inputs, and output the second encrypted data that is obtained by encrypting the input data of the target to be checked through the key, that is, the second encrypted data that satisfies a relationship that a sum of an encrypted data 1 that is obtained by encrypting a plaintext 1 through a key 1 and an encrypted data 2 that is obtained by encrypting a plaintext 2 through a key 2 is equal to an encrypted data that is obtained by encrypting a sum of the plaintext 1 and the plaintext 2 through a sum of the key 1 and the key 2;

generating the key that is input; and accepting the input data of the target to be checked and the key that is generated, as inputs, and outputting the second auxiliary data that is used to verify that a Hamming distance of the plaintexts, which corresponds to a difference between the second encrypted data that is output and the first encrypted data that is output is a predetermined certain value or less;

accepting an identifier as an input, and outputting the identifier, and performing output of the first encrypted data and the first auxiliary data that correspond to the identifier;

accepting the second encrypted data that is output, and the first encrypted data that is stored, as inputs, and outputting a difference between the input two encrypted data;

accepting the difference between the encrypted data, which is output, the first auxiliary data, and the second auxiliary data that is output, as inputs, and determining whether or not a Hamming distance of the plaintexts, which corresponds to the difference between the first and second encrypted data is a predetermined certain value or less; and controlling transmission and reception of data.

* * * * *

UNITED STATES PATENT AND TRADEMARK OFFICE
CERTIFICATE OF CORRECTION

PATENT NO. : 9,906,363 B2
APPLICATION NO. : 14/412489
DATED : February 27, 2018
INVENTOR(S) : Satoshi Obana et al.

Page 1 of 3

It is certified that error appears in the above-identified patent and that said Letters Patent is hereby corrected as shown below:

In the Specification

Column 2, Background Art, Line 28; Delete "''C''''" and insert --"C'"--therefor

Column 2, Background Art, Line 29; Delete "''S''.'" and insert --"S'".-- therefor Column 2, Background Art, Line 30; Delete "''5''''" and insert --"S'"-- therefor Column 16, Description of Embodiments, Line 28; Delete "''Z''''" and insert --"Z'"-- therefor Column 16, Description of Embodiments, Line 33; Delete "''S''''" and insert --"S'"-- therefor Column 16, Description of Embodiments, Line 34; Delete "''Z'',''" and insert --"Z'",-- therefor Column 16, Description of Embodiments, Line 38; Delete "''C''''" and insert --"C'"-- therefor Column 16, Description of Embodiments, Line 39; Delete "''Z''.'" and insert --"Z'".-- therefor Column 16, Description of Embodiments, Line 39; Delete "''C''''" and insert --"C'"-- therefor Column 16, Description of Embodiments, Line 41; Delete "''S'',''" and insert --"S'",-- therefor Column 17, Description of Embodiments, Line 12; Delete "''Z'',''" and insert --"Z'",-- therefor Column 17, Description of Embodiments, Line 18; Delete "''h''''" and insert --"h'"-- therefor Column 17, Description of Embodiments, Line 20; Delete "''S'',''" and insert --"S'",-- therefor Column 17, Description of Embodiments, Line 23; Delete "''W2''''" and insert --"W2'"-- therefor Signed and Sealed this
Fourth Day of June, 2019

Andrei Iancu
*Director of the United States Patent and Trademark Office*

CERTIFICATE OF CORRECTION (continued)
U.S. Pat. No. 9,906,363 B2

Column 17, Description of Embodiments, Line 36; Delete ""Bns=g(nc)" and insert --"Bns=g(ns*nc)-- therefor Column 17, Description of Embodiments, Line 58; Delete ""W1"" and insert --"W1"-- therefor Column 19, Description of Embodiments, Line 30; Delete ""Z"" and insert --"Z"-- therefor Column 19, Description of Embodiments, Line 33; Delete ""S"" and insert --"S"-- therefor Column 19, Description of Embodiments, Line 35; Delete ""Z"." and insert --"Z".-- therefor Column 19, Description of Embodiments, Line 36; Delete ""S"" and insert --"S"-- therefor Column 19, Description of Embodiments, Line 40; Delete ""C"" and insert --"C"-- therefor Column 19, Description of Embodiments, Line 40; Delete ""S"" and insert --"S"-- therefor Column 19, Description of Embodiments, Line 41; Delete ""Z"." and insert --"Z".-- therefor Column 20, Description of Embodiments, Line 13; Delete ""W2"" and insert --"W2"-- therefor Column 20, Description of Embodiments, Line 20; Delete ""W3"" and insert --"W3"-- therefor Column 20, Description of Embodiments, Line 21; Delete ""Z"." and insert --"Z".-- therefor Column 20, Description of Embodiments, Line 24; Delete ""r"." and insert --"r".-- therefor Column 20, Description of Embodiments, Line 32; Delete ""W2", "W3"," and insert --"W2", "W3",-- therefor Column 20, Description of Embodiments, Line 49; Delete ""W3[i](+)W3"." and insert --"W3[i](+)W3".-- therefor Column 20, Description of Embodiments, Line 62; Delete ""WIN"" and insert --"W1[i]"-- therefor Column 20, Description of Embodiments, Line 62; Delete ""Z"" and insert --"Z"-- therefor Column 21, Description of Embodiments, Line 4; Delete ""Z"" and insert --"Z"-- therefor In the Claims Column 22, Line 35; In Claim 1, after "by", insert --encrypting the input data of the target to be verified, and determine whether or not the Hamming--

CERTIFICATE OF CORRECTION (continued)
U.S. Pat. No. 9,906,363 B2

Column 28, Line 1; In Claim 12, after "by", insert --encrypting a plaintext 1 through a key 1 and an encrypted data 2 that is obtained by encrypting a plaintext 2 through a key 2 is equal to an encrypted data that is obtained by encrypting a sum of--

Column 28, Line 14; In Claim 12, before "first", delete "the"